Dec. 30, 1941.　　　　　E. L. ROSE　　　　　2,268,227
RELIEF VALVE
Filed Dec. 17, 1937　　　　2 Sheets-Sheet 2

INVENTOR
EDWIN L. ROSE
BY
Ralph L. Tweedale
ATTORNEY

Patented Dec. 30, 1941

2,268,227

UNITED STATES PATENT OFFICE 2,268,227

RELIEF VALVE

Edwin L. Rose, Watertown, Conn., assignor to Waterbury Tool Company, Waterbury, Conn., a corporation of Connecticut Application December 17, 1937, Serial No. 180,334

8 Claims. (Cl. 137—53)

This application is a continuation in part of my copending application for improvements in Power transmission, Serial Number 108,644, filed October 31, 1936.

This invention relates to power transmission and particularly to those of the type comprising two or more fluid pressure energy translating devices, one of which may function as a pump and another as a motor. In power transmissions of this type two fluid conduits are provided for the supply and return of pressure fluid between the pump unit and the motor unit. In many such devices the system is reversible so that either of the two conduits may be the high pressure conduit depending upon the direction in which the resisting load is applied.

It is customary to provide means for relieving excessive pressure from the high pressure conduit to prevent damage to the power transmission or to the elements with which it is associated. This means usually takes the form of a springloaded relief valve set to open into a relieving passage whenever a predetermined pressure is exceeded. In many applications the relief valves must be capable of passing the full volume delivered by the pump. With systems operating at high pressures, of the order of two thousand pounds per square inch, the size of spring required for a simple relief valve sufficiently large to pass the full quantity supplied by the pump, is extremely large. To avoid the use of such large springs use has been made of so-called balanced relief valves in which a differential area effect is utilized which permits a small spring while permitting sufficient area at the valve opening.

In the reversible systems it has been customary heretofore to provide separate relief valves for each of the two conduits, or to use a single relief valve with a shuttle valve to transfer its connection from one conduit to the other. It is desirable in any system of this character to provide for relieving the pressure fluid directly from the high pressure conduit to the low pressure conduit since this avoids emptying the working circuit of the system when the relief valve opens. In reversible machines this necessitates duplicated by-pass conduits when two independent valves are used, or requires double shuttle valves where a single relief valve is employed.

Another difficulty experienced with relief valves of the balanced type is incurred when the valve is designed so the differential area is small relative to the total area exposed to the working pressure in one direction.

It has been found that with a valve of this character which is correctly designed for the static pressure forces exerted on the valve, satisfactory operation cannot be obtained due to the effect of dynamic pressure forces which appear as soon as the valve begins to open. Thus it frequently occurs that a valve of this character will open a small distance, far short of its required full opening, and due to pressure drops caused by high velocity flow adjacent the opening will come into equilibrium and prevent further opening of the valve except at an increased pressure.

It is an object of the present invention to provide a power transmission system of the character described in which a single by-pass conduit between the two sides of the main circuit is controlled by a single relief valve which is operable to open on excessive pressure in either conduit.

It is also an object to provide such a device wherein the valve is of the so-called balance type permitting the use of a small closing spring without sacrificing opening area.

A further object is to provide a device of the stated character which will be inherently free from objectionable chatter without requiring separate damping means such as dashpots, etc.

A further object is to provide a power transmission incorporating a relief valve capable of passing the full discharge of the pump and operative to move from a very small opening to full opening without requiring a significant increase in pressure; in other words, to provide a relief valve in which the pressure at which it operates is independent of the quantity discharged through the valve.

Further objects and advantages of the present invention will be apparent from the following description, reference being had to the accompanying drawings wherein a preferred form of the present invention is clearly shown.

Figure 2:
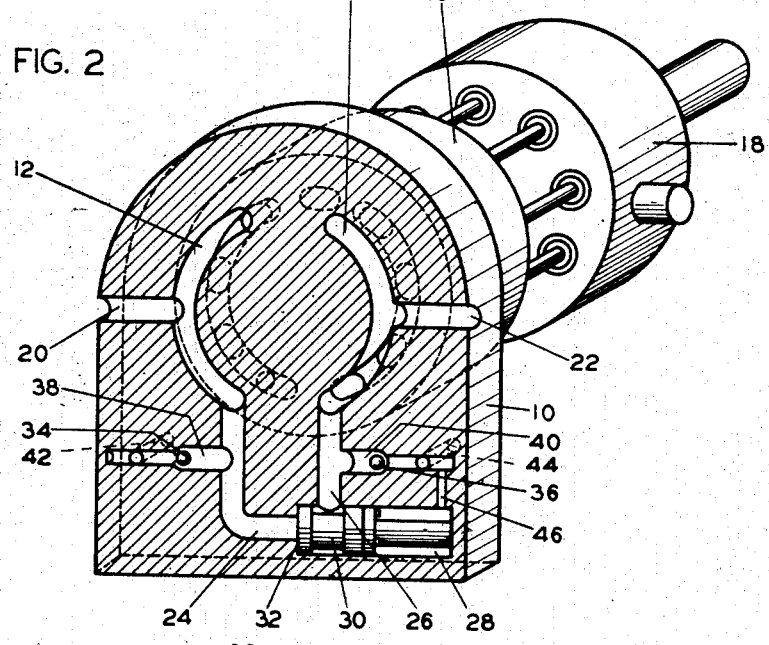
Fig. 2 is a diagrammatic view of a power transmission device showing the location of the relief valve with respect to the other elements of the device.

Referring now to Fig. 2 there is illustrated diagrammatically a fluid pressure energy translating device which may function, for example, as a variable displacement pump. The device illustrated is of the well-known "Waterbury" type having a valve plate 10 containing a pair of arcuate ports 12 and 14 to one of which fluid is delivered from a cylinder barrel 16 and from the other of which fluid is withdrawn into the cylinder barrel. The quantity of fluid pumped and the direction of pumping may be varied by changing the inclination of the tilting box and socket ring assembly 18 so that either the port 12 or the port 14 may be the high pressure side of the system. The ports 12 and 14 are connected by conduits 20 and 22 respectively with another fluid pressure energy translating device which may function as a fluid motor.

The valve plate 10 is formed with branch conduits 24 and 26 which together form a by-pass passage between the ports 12 and 14. Within a bore 28 which is perpendicular to the conduit 26 and which connects at its inner end with the conduit 24 is mounted a relief valve unit 30, the body of which is pressed tightly against an annular shoulder 32 with a press-fit between the body and the bore 28. Suitable replenishing valve means may also be provided in the valve plate 10 comprising a pair of ball check valves 34 and 36 positioned in bores 38 and 40 which connect to the conduits 24 and 26. Perpendicular bores 42 and 44 open to the barrel side of the valve plate for admitting fluid from the casing, not shown, of which the valve plate 10 forms a part. A branch conduit 46 connects the right-hand end of the bore 28 with the interior of the casing through the bores 40 and 44.

Figure 1:
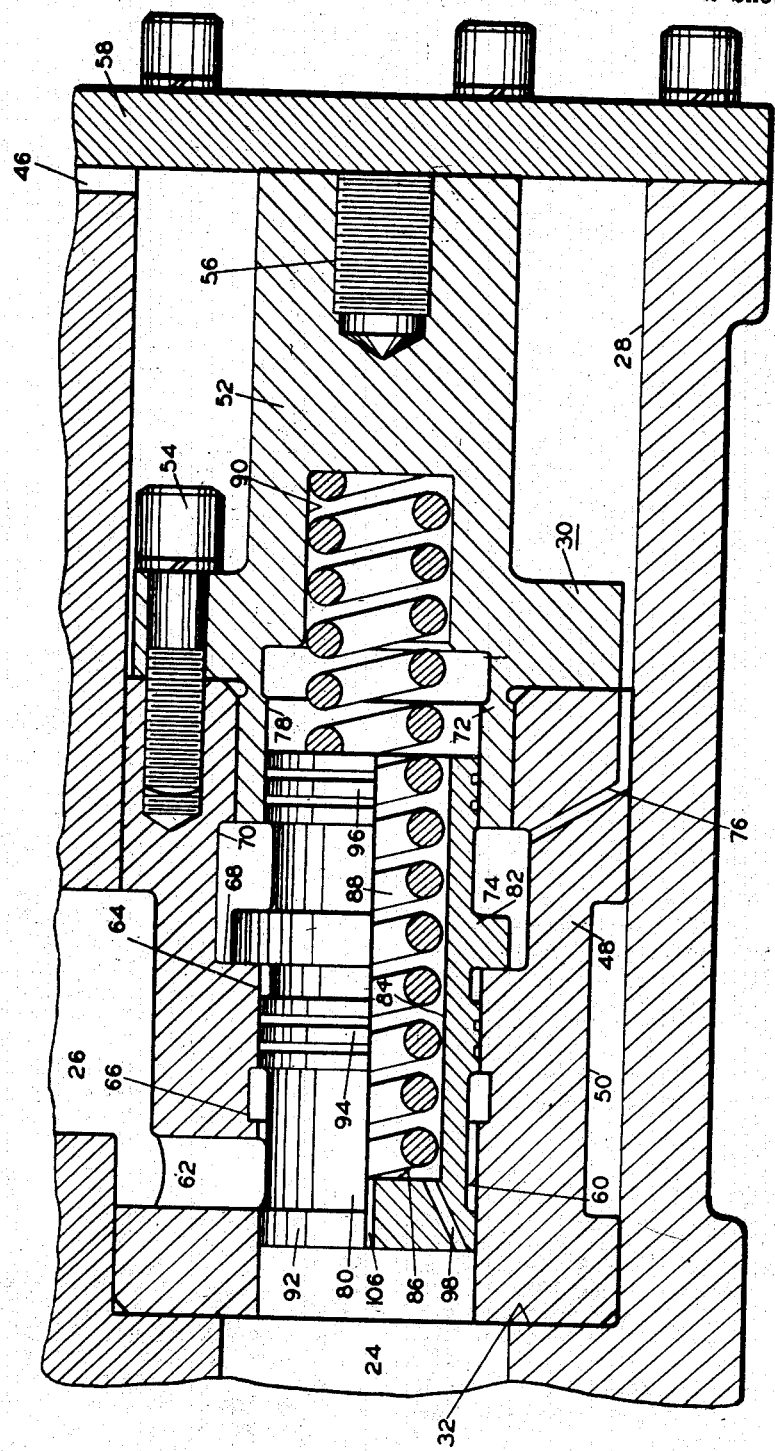
Fig. 1 is a fragmentary sectional view of a portion of a power transmission device incorporating a preferred form of the present invention.

Referring now to Fig. 1, the valve unit 30 comprises a body member 48 having a reduced outer diameter at 50 in register with the passage 26. The right-hand end of the body member 48 is closed by a second body member 52, the two body members being secured together by suitable fastening means 54. The member 52 is preferably formed with a threaded recess 56 wherein a suitable screw eye or other members may be inserted for pulling the valve 30 from bore 28 when it is necessary to remove the same. The right-hand end of the bore 28 is closed by an end cap 58 which preferably abuts against the right-hand end of the member 52 as illustrated in Fig. 1. The body member 48 is provided with an internal bore, one section 60 of which is in communication with the passage 26 and reduced portion 50 through a plurality of radial holes 62. To the right of the section 60 is a section 64 which is of somewhat larger diameter than section 60. The bore is relieved between the sections 60 and 64 as at 66 for grinding the bore sections 60 and 64. To the right of the section 64 is a shoulder 68 adjacent which the bore is of large diameter as at 70.

The body member 52 is provided with a tubular projection 72 which fits within the right-hand end of the bore of the body member 48 to form a chamber 74 which is in communication with the right-hand end of the bore 28 through a small passage 76. The tubular projection 72 has an internal bore section 78, the diameter of which is smaller than that of the bore section 60. Preferably, the diameter of the bore sections 60, 64 and 78 are such that the difference in area between the sections 60 and 64 is equal to the difference in area between the sections 60 and 78.

Slidably mounted within the bores of the body members 48 and 52 is a piston valve 80 having a shoulder 82 which normally abuts against the shoulder 68. The piston member 80 is formed with an internal bore 84 having a closed end 86 against which one end of a spring 88 abuts. The opposite end of the spring 88 is received in a bore 90 formed in the body member 52. The piston 80 is formed with three ground-surface cylindrical sections 92, 94 and 96 which are carefully matched to the bore sections 60, 64 and 78, respectively, so that a freely slidable yet substantially fluid tight fit is maintained.

The end wall 86 of the piston 80 is provided with a plurality of conduits which are for the purpose of transmitting between opposite ends of the piston in such a manner that the average pressure acting on the lower end of the piston in Fig. 1 is transmitted to the upper end face thereof. For this purpose the small restricted bores 98, 100, 102, 104 and 106 are disposed across the end bore of the piston so that each serves an approximately equal area of the end face. Thus the bores may be so arranged that the squares of the radii to each bore are in arithmetical progression with proper allowance for the circular area served by the central bore 106.

In operation, it being assumed that the transmission system within which the device is incorporated is operated so that the port 12 is the high pressure port and that the pressure therein exceeds the predetermined value for which the valve 30 is designed, it will be seen that the piston 80 is subject to fluid pressure forces over an effective area which is equal to the difference between the area of the section 60 and that of the section 78 since fluid pressure in conduit 24 is exerted over the left-hand end of the piston 80 and transmitted through the bore 84 to be exerted with equal intensity over the right-hand end of the piston 80. Since the bore section 60 is somewhat larger than the bore section 78 the resultant force is to the right so that the valve moves to the right, permitting the piston section 92 to pass beyond the left-hand edge of the radial bores 62, thus opening the by-pass through conduit 24, bore 62 and conduit 26. The excessive fluid pressure is thereby relieved until the pressure drops to a point where it is no longer able to hold the piston 80 to the right of the radial bores 62 against the force of the spring 88.

If the conditions of operation are reversed so that the port 14 becomes the high pressure port, this pressure is transmitted through the conduit 26 and the bore 62 to the annular space around the piston 80 between the piston sections 92 and 94. The piston 80 is thus subject to a fluid pressure force over an effective area equal to the difference between the area of the cylindrical sections 60 and 64. Since the section 64 is of larger area than the section 60, this resultant force tends also to move the piston to the right, opening a passage from conduit 26 through bore 62 and to conduit 24, and relieving excessive pressure in the same manner as before. The passages 46 and 76 permit the necessary "breathing" action to and from the chamber 74 which arises from the difference in area between the bore sections 64 and 78. By making either or both of these passages of small section a damping effect is produced tending to prevent vibration and chattering of the valve.

Figure 3:
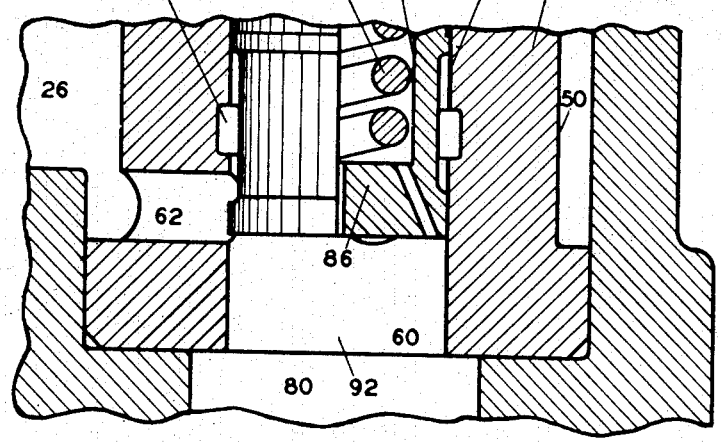
Fig. 3 is a fragmentary view corresponding to Fig. 1 showing the valve partly open.
Figure 4:
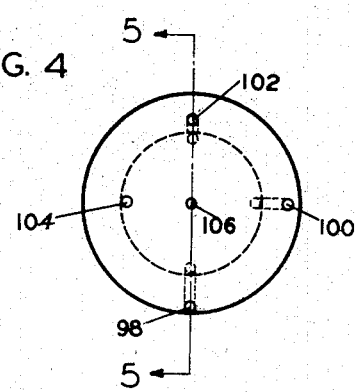
Fig. 4 is an end view of the valve piston.
Figure 5:
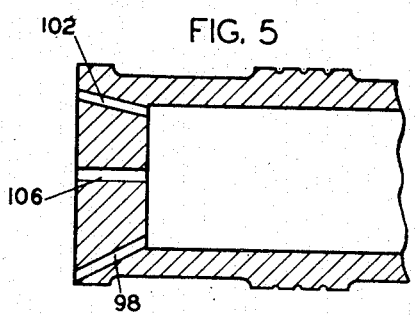
Fig. 5 is a section on line 5—5 of Fig. 4.

When the valve is partly open as shown in Fig. 3 the velocity of flow through the narrow passage at the lower edge of the piston 92 becomes extremely high. Due to this high velocity flow adjacent to the end face of the piston there is a drop in pressure in the fluid acting on the end face proportional to the square of the velocity. This drop varies all across the end face and is naturally the greatest where the velocity is greatest. Since the bores 98—106 are arranged to serve various portions of the end face and since they are of restricted cross section, it will be seen that the pressure in the bore 84 will be substantially the average pressure exerted over the whole end face of the piston 80.

While it is preferred to arrange the conduits 98—106 in the manner disclosed, it will be understood that the arrangement thereof may be varied both in the number of bores used and in the distribution thereof across the face of the piston. In general the larger the number of bores used and the more perfect their division of the face area into equal sections, the more accurately will the pressure in bore 84 correspond to the true average pressure on the end face. In actual practice, however, such accuracy may be sacrificed to convenience in manufacture to any extent desired.

The relationship between the areas of the three bore sections 60, 64 and 78 need not be such as to provide equal difference therebetween. For example, if it is desired to provide a lower limit for the pressure in one side than for the other side, the differential area effected by the pressure on the one side may be made larger than that for the other side.

While the form of embodiment of the invention as herein disclosed, constitutes a preferred form, it is to be understood that other forms might be adopted, all coming within the scope of the claims which follow.

What is claimed is as follows:

1. In a fluid pressure device having a pair of conduits either of which may be subject to high pressure while the other is subject to a lower pressure, the combination of means forming a cylindrical chamber having three sections of large, intermediate and small respective cross sections, the intermediate section being disposed to one side of the other two sections, a piston slidable in said bore and having spaced cylindrical portions slidably engaging the respective chamber sections and having a valve portion arranged to control communication between said conduits, resilient means urging the piston in the direction to close the valve, said piston being subject to the pressure in one conduit over an effective area equal to the difference between said large and intermediate sections and subject to the pressure in the other conduit over an effective area equal to the difference between the intermediate and small sections and arranged to open the valve by piston movement in one direction whenever the pressure in either conduit exceeds a predetermined value.

2. In a fluid pressure device having a pair of conduits either of which may be subject to high pressure while the other is subject to a lower pressure, the combination of means forming a passage connecting said conduits, and a single, double-acting relief valve normally closing said passage and having a differential area exposed to pressure in one conduit urging the valve in one direction to open said passage and having another differential area exposed to pressure in the other conduit urging the valve in the same direction to open the said passage, and means for compensating localized pressure drops arising from high velocity flow through the open valve.

3. In a fluid pressure device having a pair of conduits either of which may be subject to high pressure while the other is subject to a lower pressure, the combination of means forming a passage connecting said conduits, and a single, double-acting relief valve normally closing said passage and having a differential area exposed to pressure in one conduit urging the valve in one direction to open said passage and having another differential area exposed to pressure in the other conduit urging the valve in the same direction to open the said passage and means including a plurality of small passages distributed across an end face of, and extending through the valve for compensating localized pressure drops arising from high velocity flow through the open valve.

4. In a fluid pressure device having a pair of conduits either of which may be subject to high pressure while the other is subject to a lower pressure, the combination of means forming a cylindrical chamber having three sections of large, intermediate and small respective cross sections, a piston slidable in said bore and having spaced cylindrical portions slidably engaging the respective chamber sections and having a valve portion arranged to control communication between said conduits, resilient means urging the piston in the direction to close the valve, said piston being subject to the pressure in one conduit over an effective area equal to the difference between said large and intermediate sections and subject to the pressure in the other conduit over an effective area equal to the difference between the intermediate and small sections and arranged to open the valve by piston movement in one direction whenever the pressure in either conduit exceeds a predetermined value, and means for compensating localized pressure drops arising from high velocity flow through the open valve.

5. In a fluid pressure device having a pair of conduits either of which may be subject to high pressure while the other is subject to a lower pressure, the combination of means forming a cylindrical chamber having three sections of large, intermediate and small respective cross sections, a piston slidable in said bore and having spaced cylindrical portions slidably engaging the respective chamber sections and having a valve portion arranged to control communication between said conduits, resilient means urging the piston in the direction to close the valve, said piston being subject to the pressure in one conduit over an effective area equal to the difference between said large and intermediate sections and subject to the pressure in the other conduit over an effective area equal to the difference between the intermediate and small sections and arranged to open the valve by piston movement in one direction whenever the pressure in either conduit exceeds a predetermined value, and means for including a plurality of small passages distributed across an end face of and extending through the piston for compensating localized pressure drops arising from high velocity flow through the open valve.

6. In a fluid pressure device having a pair of conduits either of which may be subject to high pressure while the other is subject to a lower pressure, the combination of means forming a passage connecting said conduits, and a single, double-acting relief valve normally closing said passage and having a differential area exposed to pressure in one conduit urging the valve in one direction to open said passage and having another differential area exposed to pressure in the other conduit urging the valve in the same direction to open the said passage, and means including conduit means extending through the valve for compensating localized pressure drops arising from high velocity flow through the open valve.

7. In a fluid pressure device having a pair of conduits either of which may be subject to high pressure while the other is subject to a lower pressure, the combination of means forming a cylindrical chamber having three sections of large, intermediate and small respective cross sections, a piston slidable in said bore and having spaced cylindrical portions slidably engaging the respective chamber sections and having a valve portion arranged to control communication between said conduits, resilient means urging the piston in the direction to close the valve, said piston being subject to the pressure in one conduit over an effective area equal to the difference between said large and intermediate sections and subject to the pressure in the other conduit over an effective area equal to the difference between the intermediate and small sections and arranged to open the valve by piston movement in one direction whenever the pressure in either conduit exceeds a predetermined value and means including conduit means extending through the piston for compensating localized pressure drops arising from high velocity flow through the open valve.

8. In a fluid pressure device having a conduit subject to variable high pressure, a relief valve comprising means forming a high pressure chamber in communication with said conduit, means forming an exhaust conduit, a piston valve normally closing communication between said chamber and exhaust conduit, said piston having an end face exposed to pressure in said chamber in a direction tending to open the valve and an area exposed to fluid pressure tending to close the valve, said piston being formed with restricted conduit means extending therethrough from said end face to said exposed area and distributed across said one end face of the piston so as to transmit the average pressure acting on said end face to the exposed area under high velocity flow through the valve.

EDWIN L. ROSE.